US011851829B2

(12) United States Patent
Berning et al.

(10) Patent No.: US 11,851,829 B2
(45) Date of Patent: Dec. 26, 2023

(54) EARTH WORKING MACHINE HAVING A DUST EXTRACTION SYSTEM WITH SELECTABLE FILTRATION OF THE EXTRACTED DUST-LADEN AIR

(71) Applicant: Wirtgen GmbH, Windhagen (DE)

(72) Inventors: Christian Berning, Zülpich (DE); Stephan Drumm, Vettelschoß (DE)

(73) Assignee: Wirtgen GmbH

( * ) Notice: Subject to any disclaimer, the term of this patent is extended or adjusted under 35 U.S.C. 154(b) by 583 days.

(21) Appl. No.: 16/952,282

(22) Filed: Nov. 19, 2020

(65) Prior Publication Data

US 2021/0164173 A1 Jun. 3, 2021

(30) Foreign Application Priority Data

Dec. 3, 2019 (DE) ...................... 10 2019 132 889.6

(51) Int. Cl.
*E01C 23/088* (2006.01)
*B01D 46/00* (2022.01)
(Continued)

(52) U.S. Cl.
CPC ........ *E01C 23/088* (2013.01); *B01D 46/0002* (2013.01); *B01D 46/0087* (2013.01);
(Continued)

(58) Field of Classification Search
CPC ............ B01D 46/0087; B01D 46/0002; B01D 46/44; B01D 46/521; B01D 2271/02;
(Continued)

(56) References Cited

U.S. PATENT DOCUMENTS

| 4,661,129 A | 4/1987 | Nederman |
| 7,175,364 B2 | 2/2007 | Gaertner et al. |

(Continued)

FOREIGN PATENT DOCUMENTS

| CN | 202638181 U | 1/2013 |
| CN | 109793458 A | 5/2019 |

(Continued)

OTHER PUBLICATIONS

China Office Action for corresponding patent application No. 2022022800607290, dated Mar. 3, 2022, 6 pages (not prior art).

(Continued)

*Primary Examiner* — Robert Clemente
(74) *Attorney, Agent, or Firm* — Lucian Wayne Beavers; Patterson Intellectual Property Law, PC

(57) ABSTRACT

A self-propelled earth working machine (10), for example a road milling machine, recycler, or surface miner, includes:
a working apparatus (12) for material-removing working of a region of a substrate (U); and
an extraction device (40) that is embodied to extract dust-laden air from at least one machine region at least one extraction location (46), and to exhaust extracted air at a discharge location (50) different from the extraction location (46),
the extraction device (40) comprising a filter apparatus (42) arranged along an operational flow path from the at least one extraction location (46) to the discharge location (50), the filter apparatus (42) encompassing:
a filter housing (54); and
a filter element (52) received in the filter housing (54), the filter element (52) being embodied to remove dust particles from the air flowing through the filter apparatus (42).
The filter apparatus (42) comprises a bypass valve (60) shiftable between two different operating positions, such (Continued)

that a filtering operating position connects the at least one extraction location (46) to the exhaust location (50) with passage through the filter element (52); and a bypass operating position connects the at least one extraction location (46) to the exhaust location (50) while bypassing the filter element (52).

14 Claims, 6 Drawing Sheets

(51) Int. Cl.
   *B01D 46/24* (2006.01)
   *B01D 46/44* (2006.01)
   *B01D 46/52* (2006.01)
   *E01C 23/12* (2006.01)
   *B01D 46/58* (2022.01)

(52) U.S. Cl.
   CPC ......... *B01D 46/2403* (2013.01); *B01D 46/44* (2013.01); *B01D 46/521* (2013.01); *B01D 46/58* (2022.01); *E01C 23/127* (2013.01); *B01D 2271/02* (2013.01); *B01D 2279/40* (2013.01)

(58) Field of Classification Search
   CPC ........ B01D 2271/022; B01D 2271/025; B01D 2271/027; B01D 2279/40; B01D 46/58; B01D 46/71; E01C 23/088; E01C 2301/50

See application file for complete search history.

(56) References Cited

U.S. PATENT DOCUMENTS

| | | | |
|---|---|---|---|
| 7,219,964 B2 | 5/2007 | Berning et al. | |
| 2005/0179309 A1 | 8/2005 | Berning et al. | |
| 2010/0327651 A1* | 12/2010 | Cipriani | E01C 23/088 299/39.2 |
| 2020/0172251 A1* | 6/2020 | Beckman | B01D 46/72 |

FOREIGN PATENT DOCUMENTS

| | | |
|---|---|---|
| DE | 10223819 A1 | 12/2003 |
| DE | 102004007716 B3 | 6/2005 |
| DE | 102012211635 A1 | 1/2014 |
| DE | 102017008745 A1 | 3/2018 |

OTHER PUBLICATIONS

Co Pending U.S. Appl. No. 16/952,289, filed Nov. 19, 2020 (not prior art).
Co Pending U.S. Appl. No. 16/952,295, filed Nov. 19, 2020 (not prior art).
European Search Report for corresponding patent No. 20211018.5, dated May 7, 2021, 6 pages (not prior art).

* cited by examiner

EARTH WORKING MACHINE HAVING A DUST EXTRACTION SYSTEM WITH SELECTABLE FILTRATION OF THE EXTRACTED DUST-LADEN AIR

CROSS-REFERENCES TO RELATED APPLICATIONS

This application claims benefit of German Patent Application No. DE 10 2019 132 889.6, filed on Dec. 3, 2019, and which is hereby incorporated by reference in its entirety.

BACKGROUND OF THE INVENTION

Field of the Invention

The present invention relates to a self-propelled earth working machine, for example a road milling machine, a recycler, or a surface miner, the earth working machine encompassing:
- a machine frame carried vertically adjustably by a plurality of crawler track units and/or wheel drive units;
- a working apparatus for material-removing working of a region of a substrate; and
- an extraction device that is embodied to extract dust-laden air from at least one machine region at least one extraction location, and to exhaust extracted air at a discharge location different from the extraction location, the extraction device comprising a filter apparatus arranged along an operational flow path from the at least one extraction location to the discharge location, the filter apparatus encompassing:
- a filter housing; and
- a filter element received in the filter housing, the filter element being embodied to remove dust particles from the air flowing through the filter apparatus.

DESCRIPTION OF THE PRIOR ART

An earth working machine of this kind embodied as a substrate milling machine, in particular a road milling machine, is known, for example, from DE 10 2004 007 716 B3.

In the existing art and preferably also in the present invention, the substrate material removed by the working apparatus is conveyed by means of a transport belt from a working apparatus housing, in which the working apparatus is received movably in order to execute a removing motion, to a delivery location. The working apparatus housing, constituting an occupational safety apparatus, shields the surroundings of the working apparatus from the working apparatus and from the substrate material removed by it. At the delivery location the conveyed removed substrate material as a rule is ejected, often onto a vehicle which accompanies the mobile, self-propelled earth working machine and disposes of or further processes the received removed substrate material.

Substrate material pieces of different grain sizes are detached from the substrate at the point at which the removing working apparatus engages with the substrate to be worked. These substrate material pieces move with high kinetic energy in the working apparatus housing, and strike the wall of the working apparatus housing and collide with one another and/or with working surfaces of ejectors on the working apparatus and with the working apparatus itself. In the context of these collisions, and already upon removal of the substrate material by the working apparatus, dust of various particle sizes, down to fine dust, is produced. This dust contaminates the air extracted by the extraction device. In the working apparatus housing and/or upon transport of the removed substrate material, the dust can transition into the air space surrounding the removed substrate material. This is the case both for the existing art and for the present invention.

DE 102 23819 A1 already teaches to extract the dust-laden air, produced by earth working, at an extraction location located closer to the working apparatus, and to discharge it onto the transport belt at a discharge location located farther from the working apparatus. Dust in the air discharged at the discharge location can be removed from the air by way of a sprinkler device that sprinkles the surroundings of the discharge location with water, and/or by way of an electrostatic precipitation apparatus.

The teaching of DE 10 2004 007 716 B3, in order to increase the working life of a conveying fan conveying the dust-laden air, is to arrange a filter apparatus upstream from the conveying fan in the flow path of the dust-laden air from the extraction location to the discharge location, and thereby to clean the air before it reaches the conveying fan. The known filter apparatus encompasses a filter apparatus in which a plurality of so-called "filter cartridges," constituting filter elements, are received in order to achieve a filter area that is as large as possible.

Because the filter elements form on their dirt side, as the filter operating time increases, a filter cake that negatively affects the filtering effect of the respective filter element when a critical size is exceeded, DE 10 2004 007 716 B3 further teaches to remove filter cake from the filter elements by vibration, or by way of a compressed-air pulse effected on the clean side of the filter element. The filter cake removed from the filter element can be delivered onto the transport belt through a configuration, for example a flap or a deformable region, in the bottom of the filter housing. The filter housing is arranged above the transport belt. The transport belt is shielded from the external environment by a cover, so that substrate material lying on the transport belt cannot travel, or can travel to only a very minor extent, from the transport belt into the environment during conveyance to the delivery location.

Because of the heavy dust load in the air conveyed away from the extraction location, the filter performance demanded of the at least one filter element is considerable. This means that a large filter area is required and/or that the at least one filter element must be replaced at relatively short time intervals, depending on wear, in order to achieve the desired filter performance.

SUMMARY OF THE INVENTION

The object of the present invention is therefore to refine the aforementioned mobile, self-propelled earth working machine in such a way that without increasing the filter area, the service life of the at least one filter element, to the point that wear-related replacement thereof is required, can be extended.

This object is achieved according to the present invention by a mobile, self-propelled earth working machine of the kind recited previously in which the filter apparatus comprises a bypass valve shiftable between two different operating positions for switching over between filtration of the extracted air and only conveyance of unfiltered air or extracted air prefiltered through a prefilter, for example a cyclone filter, without further filtering effect. In a filtering operating position, the bypass valve then connects the at least one extraction location to the exhaust location with passage through the filter element. In a bypass operating position, the bypass valve connects the at least one extraction location to the exhaust location while bypassing the filter element. The bypass valve preferably comprises only the filtering operating position and the bypass operating position.

The service life of the filter element can thus be increased by the fact that a filtering mode of the filter apparatus occurs only when it is actually needed. In urban areas already impacted in any case by fine dust, operation of the filter apparatus is therefore advisable in order to avoid an increase in fine dust contamination, whereas filtering of the extracted dust-laden air is not absolutely necessary during earth working outside urban areas. If the discharge location is sufficiently distant from an operator's platform of the earth working machine on which an operator controlling the earth working machine is active during earth working, the dust impact on the operator is negligible. When, in accordance with a preferred refinement, the initially extracted dust-laden air is discharged into a conduit that surrounds a transport apparatus conveying the removed substrate material, the discharged air comes into the open air only at the location where the substrate material is discharged or ejected from the transport apparatus. That discharge location is, as a rule, that point on the earth working machine which is located farthest from the operator's platform during earth-working operation as intended.

The bypass valve can be constructed in physically simple fashion. It can comprise a movable valve component that comprises an exit opening of an upstream conveying conduit for the dust-laden air. Motion of the valve component allows the exit opening of the upstream conveying conduit to be flow-conveyingly connecting to a desired one of two entry openings on a downstream side of the bypass valve, in particular a separating gap between the exit opening and entry openings.

The bypass valve can encompass a valve component that is movable relative to the filter housing, and a filter-housing-mounted valve component. The movable valve component can be pivotable relative to the filter-housing-mounted valve component around a valve axis through a predetermined angle, preferably through 180° for effective separation of the two operating positions and thus in order to avoid undesired mispositioning or incorrect operation. Alternatively or additionally, the movable valve component can be translationally displaceable relative to the filter-housing-mounted valve component. An exit opening of a conveying conduit that is upstream with respect to the bypass valve can be connected to the movable valve component.

The filter-housing-mounted valve component can comprise the aforementioned two entry openings, of which a first entry opening leads into a first compartment of the filter housing in which at least one filter element is received, and of which a second entry opening leads into a second compartment of the filter housing, which compartment does not perform any filtering action, for example because no filter elements to be passed through by dust-laden air are arranged in the second compartment.

The movable valve component is preferably constructed, in particular asymmetrically constructed, in such a way that it closes off that entry opening on the side of the filter-housing-mounted valve component which is not connected to the exit opening of the movable valve component. Undesired aspiration of leakage air by the conveying fan can thereby be avoided. The entire conveying effect of the conveying fan can then advantageously act on the air flow actually intended for the conveyance of dust-laden air.

In order to ensure closure of the entry opening that is not activated in the respective operating position of the bypass valve, the movable valve component and/or the filter-housing-mounted valve component can be embodied with a flat bounding surface at least on the mutually facing sides of the valve components. The entry openings or the exit opening can be equipped with preferably elastic, particularly preferably elastomeric sealing configurations projecting toward the respective other valve component, in order to span in maximally gas-tight fashion a separating gap between the movable valve component and the filter-housing-mounted valve component. The movable valve component and/or the filter-housing-mounted valve component can preferably encompass a plate-shaped, flat component from which at least one attachment configuration for attaching an air-carrying conveying conduit can protrude on the upstream side of the movable valve component, and/or at least one attachment configuration can protrude on the downstream side of the filter-housing-mounted valve component. Preferably, a respective attachment configuration protrudes from each entry opening on the downstream side of the filter-housing-mounted valve component.

In principle, the bypass valve can be movable manually between its operating positions associated with different air flow paths. Preferably, the bypass valve encompasses a valve drive system that, upon actuation of a control switch on the operator's platform of the earth working machine, shifts the bypass valve between at least two of its operating positions.

In physical terms, according to a preferred embodiment of the earth working machine according to the present invention the bypass valve, in the filtering operating position, can connect the at least one extraction location to the filter housing in such a way that an interior space of the filter housing which receives the filter element is part of the flow duct for dust-laden air which connects the at least one extraction location to the discharge location. The bypass valve can furthermore, in the bypass operating position, connect the at least one extraction location to the discharge location while bypassing the interior space of the filter housing which receives the filter element, and thus bypassing the filter element.

In the present Application, one filter element is discussed when describing the invention that is presented. This serves merely for illustration, and is not an indication of quantity. Although a single filter element can suffice, the filter apparatus of the present invention preferably comprises a plurality of filter elements. Each filter element can be mounted in the filter housing rotatably around a rotation axis. The rotation axes of the filter elements are then preferably parallel to one another for advantageously efficient utilization of the available installation space.

The filter elements of the present invention are also preferably roughly cylindrical filter elements having a cylindrical envelope, or roughly conical filter elements having a conical envelope. The "roughly conical" filter elements also include frustoconical filter elements. The filter elements can deviate from an ideal cylindrical or conical shape at their longitudinal ends, for instance because the filter elements require a coupling configuration for coupling to a counterpart coupling configuration on the filter housing, and/or because porous filter material of the filter element, enveloped by the envelope, is to be physically positionally defined at both longitudinal end regions of the filter element, for instance by way of corresponding end pieces.

The mobile earth working machine under discussion here is a self-propelled earth working machine that comprises a machine frame carried vertically adjustably by a plurality of crawler track units and/or wheel drive units. The machine frame in turn carries (preferably intentionally detachably) the working apparatus which, according to a preferred embodiment, is a milling drum having a cylindrical base element on which milling bits, and preferably also ejectors, are arranged. The working apparatus housing which is recited previously and which, in an advantageous refinement, the earth working machine comprises in order to shield the working apparatus, is then a so-called "milling drum housing." For easier replacement of the milling bits that are subject to heavy wear during substrate removal, quick-change bit holders, in which milling bits can be received in intentionally detachable fashion, are arranged on the outer side of the cylindrical base element. For easier transport of the substrate removed from the substrate by the milling bits, the quick-change bit holders are preferably arranged in roughly helical fashion on the base element in order to achieve, upon rotation of the milling drum, an axial conveying effect, along the rotation axis of the milling drum, exerted on the removed substrate material. Usually, at least one respective quick-change bit holder helix proceeds from each axial longitudinal end of the milling drum toward the axial center of the milling drum, in order to generate an axial conveying effect from each longitudinal end to the axial center of the milling drum.

In an advantageous refinement of the invention, the earth working machine can comprise a conveying fan in order to convey the dust-laden air, the filter apparatus, in particular the filter element, preferably being located on the intake side of the conveying fan so that the air conveyed by the conveying fan reaches the conveying fan in a cleaned state. The fewer dust particles that are contained in the conveyed air, the less the abrasive effect of the conveyed air on the conveying fan. The conveying fan can encompass an axial fan that is robust with respect to dust-laden air. Alternatively, the conveying fan can encompass a radial fan that occupies less installation space than an axial fan having the same conveying performance.

When an "intentionally detachable" arrangement is discussed in the present Application, this refers to a nondestructively detachable arrangement that can be brought about, for example, by threaded connections, bayonet connections, and the like, in contrast to nondetachable arrangements, for example welded or riveted connections, that can be undone only destructively.

According to the present application, a portion "faces" in a direction if a surface normal line proceeding from the portion comprises a component that faces in the indicated direction.

A worn-out filter element can be particularly easily and quickly replaced with a fresh one if it is detachably coupled at one longitudinal end, preferably at only one longitudinal end, to a filter element receptacle. In order to achieve a preferred rotatability of the filter element, it is sufficient if the filter element receptacle arranged on the filter housing is received in or on the filter housing rotatably around the rotation axis. The filter element itself then does not need to furnish any rotatability and/or comprise any configuration for transferring a drive torque from a rotational drive to the filter element. A configuration of this kind interacting with the rotational drive can be embodied solely on the filter element receptacle.

In principle, the filter element has a dirt side located, in terms of an operational flow direction of the dust-laden air from the extraction location to the discharge location, upstream from a porous filter material furnishing the filtering action of the filter element, and a clean side located downstream from the filter material.

Unless otherwise stated in the present Application, the indications "upstream" and "downstream" refer to the operational flow direction of the dust-laden air from the extraction location to the discharge location.

The extraction location is located closer to the working apparatus than the discharge location, since the dust load of the air in an air conduit leading toward the working apparatus rises with increasing proximity to the working apparatus.

In order to reduce stress on the filter element of the filter apparatus during filtering operation, the filter apparatus can comprise a prefilter that is different from the filter element and is arranged preferably outside the filter housing, so that only pre-cleaned dust-laden air is directed to the filter element. So-called "cyclone" filters, which remove dust particles above a specific particle size from the dust-laden air, have proven successful as such prefilters. The result is that, preferably, only dust particles below a specific particle size, or a specific particle size range, reach the at least one filter element in the filter housing. The filter material of the filter element can be particularly well matched, in terms of its porosity and its permeability, to the particle size range of the dust particles in the pre-cleaned air, so that the cleaning effect of the filter element can be further enhanced.

As has already been mentioned above, the earth working machine preferably comprises a transport apparatus with which substrate material removed by the working apparatus is conveyable away from the working apparatus to a delivery location. In order for the quantities of removed substrate material which occur per unit time to be reliably transported away, the transport apparatus preferably encompasses as a transport means at least one conveyor belt, preferably at least two conveyor belts that follow one in a conveying direction, which, in order to reduce dust contamination of the surroundings of the earth working machine, is/are enclosed over at least 90% of its/their conveying length. Other transport apparatuses, however, for example screw conveyors and the like, are nevertheless also not excluded.

According to an advantageous refinement, the filter housing is arranged above the transport apparatus. The dust particle material, which as a rule is minerally bound, can then leave the filter housing in response to gravity and arrive at the transport apparatus, where it is transported to the delivery location along with the removed substrate material.

BRIEF DESCRIPTION OF THE DRAWINGS

The present invention will be explained below with reference to the appended drawings, in which.

DETAILED DESCRIPTION

Figure 1:
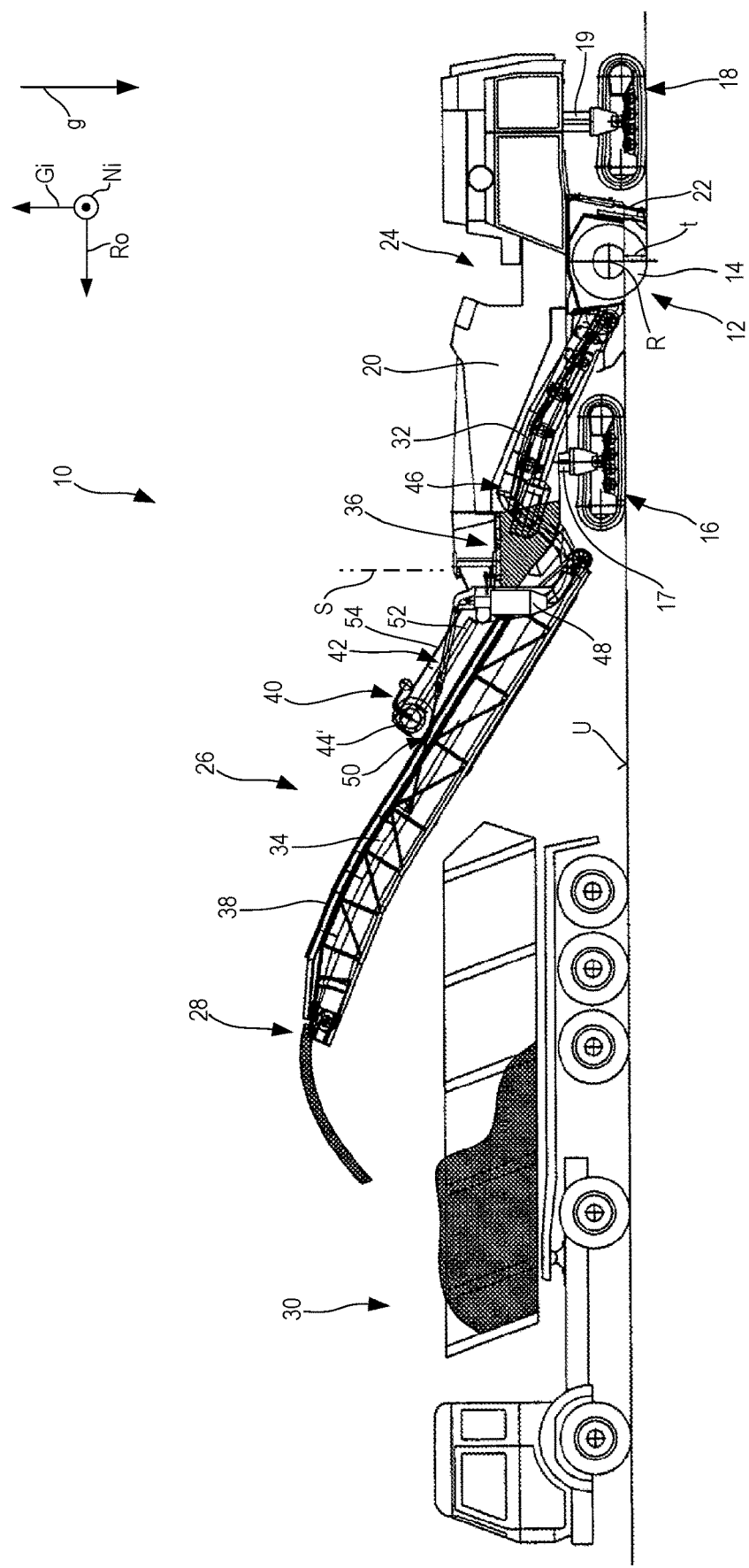
FIG. 1 is a schematic side view of an earth working machine according to the present invention during processing that removes substrate material.

In FIG. 1, an earth working machine (hereinafter referred to simply as a "machine") according to the present invention is labeled in general with the number 10. What is depicted by way of example as machine 10 according to the present invention is a large road milling machine, working apparatus 12 of which, having a milling drum 14 known per se as is typical for large road milling machines, is arranged between front drive units 16 and rear drive units 18. The drive units 16 and 18 may also be referred to as ground engaging units which may be crawler track units and/or wheel drive units. Drive units 16 and 18, each drivable for propelled motion preferably by a hydraulic motor (not depicted), are steerable, and carry a machine frame 20 that in turn carries working apparatus 12. Machine 10 is thus a self-propelled vehicle.

Figure 2:
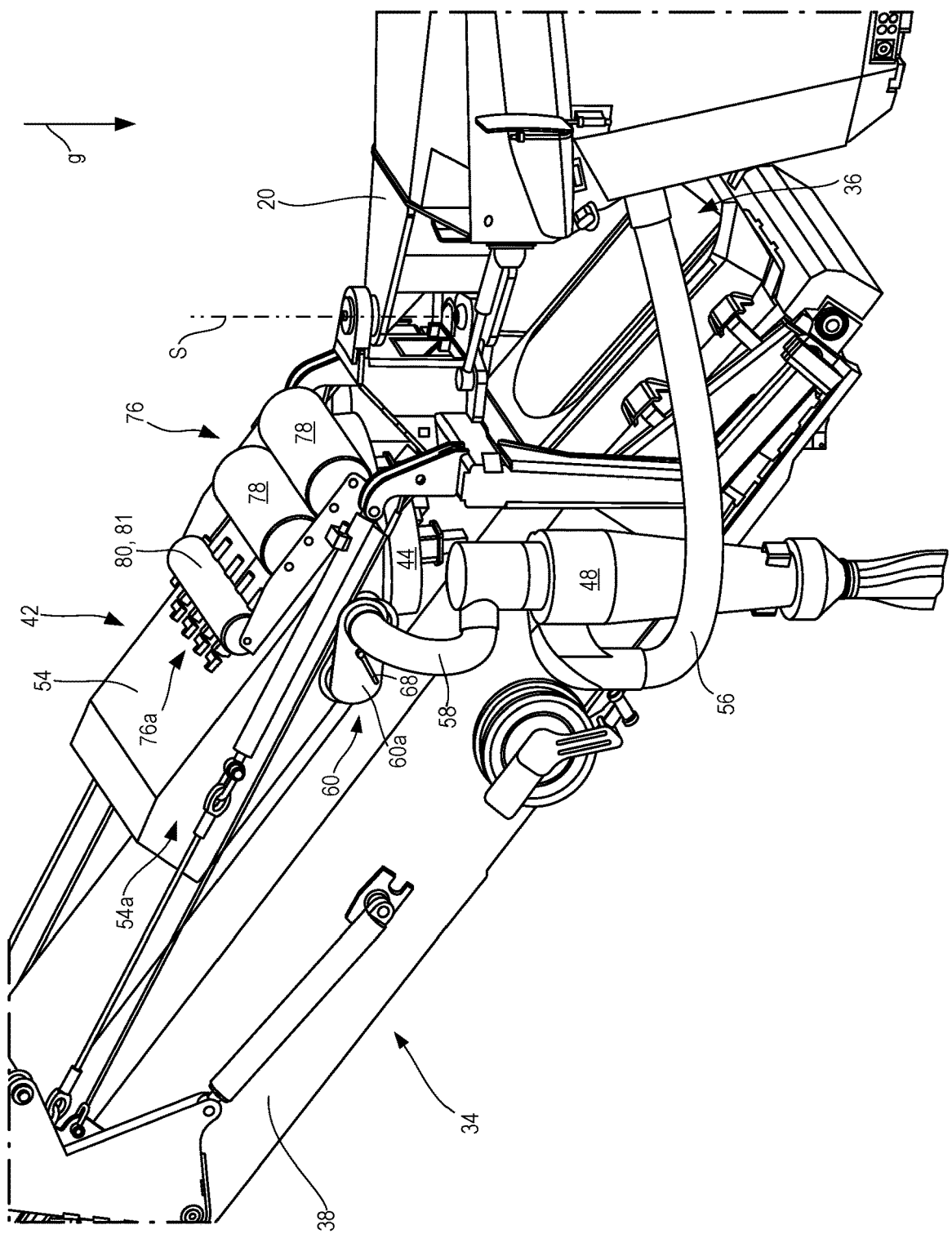
FIG. 2 is a perspective view of an enlarged portion of the ejector belt of the transport apparatus, having arranged thereon a filter apparatus of the earth working machine of FIG. 1.
Figure 3:
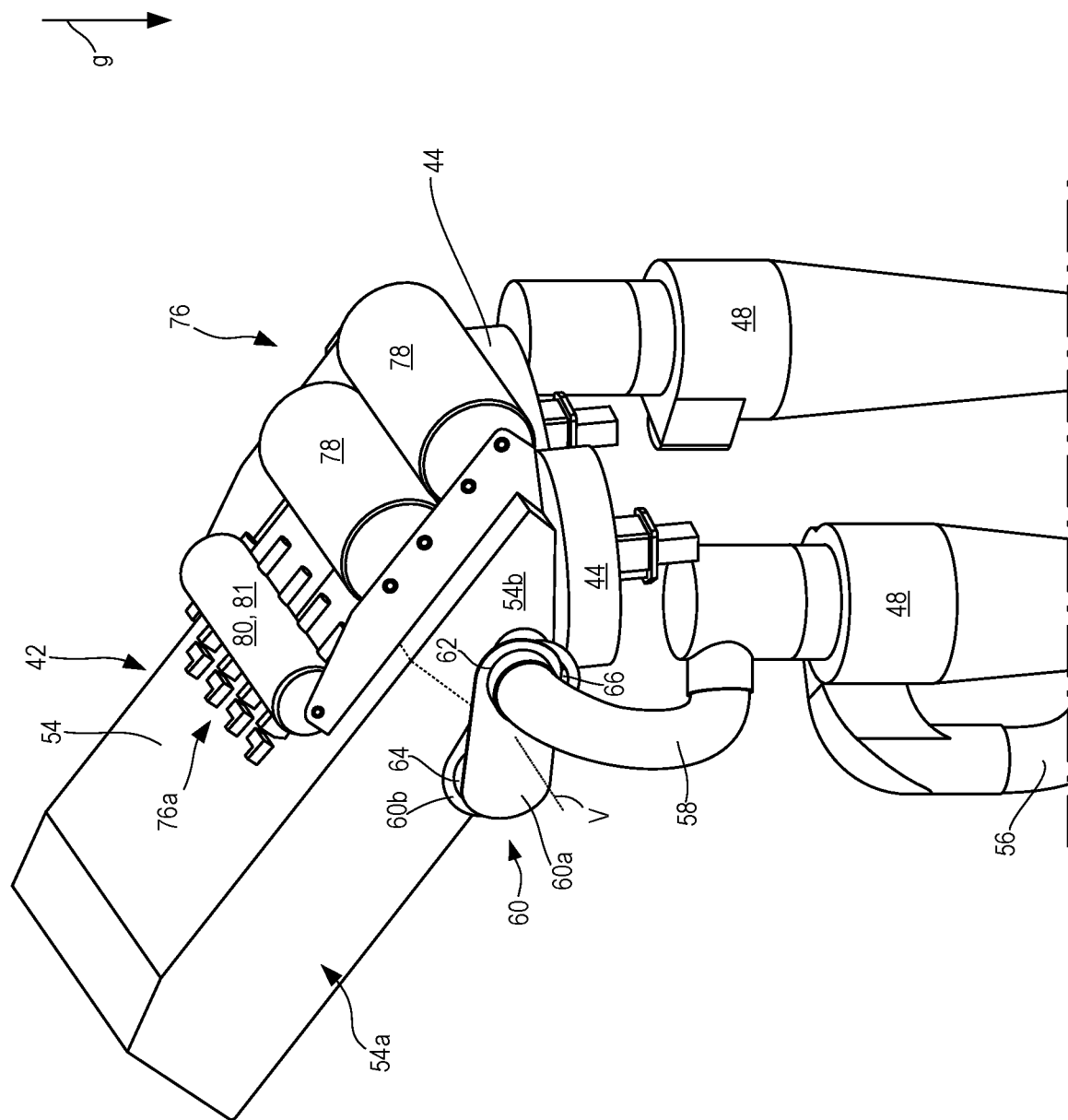
FIG. 3 is a schematic perspective view of the filter apparatus of FIG. 2, including a prefilter, of the earth working machine of FIG. 1.

The direction of gravity is labeled with an arrow g in FIGS. 1 to 3.

Milling drum 14, rotatable around a rotation axis R that is orthogonal to the drawing plane of FIG. 1 and proceeds parallel to pitch axis Ni of machine 10, is shielded with respect to the external surroundings of machine 10 by a milling drum housing 22 that supports milling drum 14 rotatably around rotation axis R. In order to enable earth working as intended by machine 10, milling drum housing 22 is open toward substrate U, on which machine 10 stands with drive units 16 and 18 and which milling drum 14 removes.

Machine frame 20 is connected to drive units 16 and 18, vertically adjustably along yaw axis Gi, via front lifting columns 17 and rear lifting columns 19, with the result that, for example, the milling depth t of milling drum 14 is adjustable.

Machine 10 can be controlled from an operator's platform 24. Operator's platform 24 can be roofed in a manner known per se.

Substrate material removed by milling drum 14 during earth working as intended is conveyed by a transport apparatus 26 from working apparatus 12 to a delivery location 28 where, in the example depicted, it is transferred to a transport truck 30 that precedes and accompanies machine 10 during earth working at a distance in the direction of roll axis Ro.

Transport apparatus 26 encompasses a receiving belt 32 located closer to working apparatus 12 and an ejector belt 34 that interacts with receiving belt 32 and is located farther from working apparatus 12. Receiving belt 32 is mounted on machine frame 20 in circulation-capable fashion, but unmodifiably with regard to its orientation relative to machine frame 20. At a transfer point 36, receiving belt 32 transfers the material conveyed by it onto ejector belt 34, which conveys the received material to delivery location 28. Ejector belt 34 is likewise circulation-capable but is pivotable relative to machine frame 20 around a pivot axis S parallel to the yaw axis and is tiltable around a tilt axis orthogonal to pivot axis S, so that delivery location 28, which coincides with the ejecting longitudinal end of ejector belt 34, is movable approximately over the surface of a spherical shell in order to adapt delivery location 28 to the respective accompanying vehicle.

Transport apparatus 26 is enclosed along its entire length by an enclosure 38 in order to avoid contamination of the external surroundings of transport apparatus 26 with dust and with material that might drop off transport apparatus 26. That part of enclosure 38 which is located above receiving belt 32 is implemented for the most part by machine frame 20.

To further reduce emissions of dirt, in particular dust, from machine 10 because of working apparatus 12, the latter encompasses an extraction device 40 having a filter apparatus 42.

In order to indicate that extraction device 40 can be configured in different ways, extraction device 40 is depicted in FIG. 1 with a conveying fan 44' at the top end of a filter housing 54. Filter apparatus 42 is located on the intake side of conveying fan 44' so that air cleaned by filter apparatus 42 passes through conveying fan 44' of extraction device 40 of FIG. 1.

Extraction device 40 extracts dust-laden air at an extraction location 46 that can be located, for example, above receiving belt 34, and conveys the dust-laden air, in the order indicated, through a prefilter 48 and through filter apparatus 42 to a discharge location 50 that either can be an outlet on conveying fan 44' which discharges directly into the external surroundings of machine 10 or can be, above ejector belt 34, an opening in enclosure 38 through which the cleaned air is taken back to transport apparatus 26, so that the cleaned air, together with the removed substrate material, emerges at delivery location 28 into the surroundings of machine 10.

Shown in filter apparatus 42 is a filter element 52 whose longitudinal axis is oriented substantially parallel to the transportation direction or to the running direction of ejector belt 34.

Filter apparatus 42 is shown in FIGS. 2 and 3 in greater detail than in FIG. 1. Filter apparatus 42 encompasses filter housing 54 in which (in the example depicted) two, but very generally a plurality of, filter elements 52 are arranged.

Unlike in FIG. 1, in FIGS. 2 and 3 conveying fan 44 is depicted in a lower portion of filter housing 54. Filter housing 54 or filter apparatus 42 is nevertheless located functionally, as in FIG. 1, on the intake side of conveying fan 44.

FIG. 3 shows in particular the mirror-symmetrical configuration of extraction device 40 in terms of first and second hose ducts 56 and 58, prefilter 48, and conveying fan 44, which are each provided in pairs with respect to a mirror symmetry plane spanned by yaw axis Gi and roll axis Ro, the mirror symmetry being applicable to an extended reference state in which ejector belt 34 and the transport device of ejector belt 34 are located in the mirror symmetry plane.

Dust-laden air is conveyed by conveying fan 44 through a first hose duct 56 from extraction location 46 to prefilter 48 configured as a cyclone filter, where a pre-cleaning of the dust-laden air occurs in a manner known per se. The pre-cleaned air, as a rule now laden only with fine dust having a particle size below a threshold value determined by the cyclone filter, is conveyed via a second hose duct 58 to a bypass valve 60, and from there the pre-cleaned air enters filter housing 54.

Filter housing 54 comprises a larger compartment 54a in which filter elements 52 are received, and a smaller compartment 54b in which no filter elements 52 are received. Filter elements 52 are therefore located in an interior space 57 of filter housing 54 or of compartment 54a.

Bypass valve 60 encompasses a valve component 60a that is movable relative to filter housing 54, and a filter-housing-mounted valve component 60b. Movable valve component

60a can be pivotable, for example, 180° relative to filter-housing-mounted component 60b around a valve axis V. An exit opening 62 of second hose duct 58, constituting a conveying conduit that is upstream with respect to bypass valve 60, is connected to movable valve component 60a via an attachment configuration 61 protruding from the preferably plate-shaped movable valve component 60a that is configured to be flat, while filter-housing-mounted valve component 60b comprises two entry openings 64 and 66, of which entry opening 64 leads via an attachment configuration 63a into compartment 54a of filter housing 54 in which filter elements 52 are received, whereas entry opening 66 leads via an attachment configuration 63b into compartment 54b having no filter elements. A handle 68 serves for adjustment of bypass valve 60 between its filtering operating position, in which bypass valve 60 connects exit opening 62 to entry opening 64, and the bypass operating position in which bypass valve 60 connects exit opening 62 to entry opening 66. Alternatively, instead of handle 68, a motorized drive system can also be provided for adjusting bypass valve 60 between its two operating positions.

A respective elastic seal configuration 65a, 65b, surrounding the respective entry opening 64, 66, can protrude from filter-housing-mounted valve component 60b from bounding surface 60b1 facing toward movable valve component 60a, in order to span in gas-tight fashion a separating gap between valve components 60a and 60b.

Conveying fan 44 always extracts air via the preferably smaller compartment 54b, devoid of filter elements, of filter housing 54. Depending on the position of bypass valve 60, conveying fan 44 aspirates air via filter elements 52 in compartment 54a or directly via entrance opening 66 without further filtration.

The preferably plate-shaped movable valve component 60a is constructed asymmetrically in such a way that it closes off that entry opening on filter-housing-mounted valve component 60b which is not connected to exit opening 62 of movable valve component 60a. Undesired aspiration of leakage air by conveying fan 44 is thereby avoided, so that the entire conveying effect of conveying fan 44 is applied to the air flow that is actually intended to be conveyed.

Figure 4:
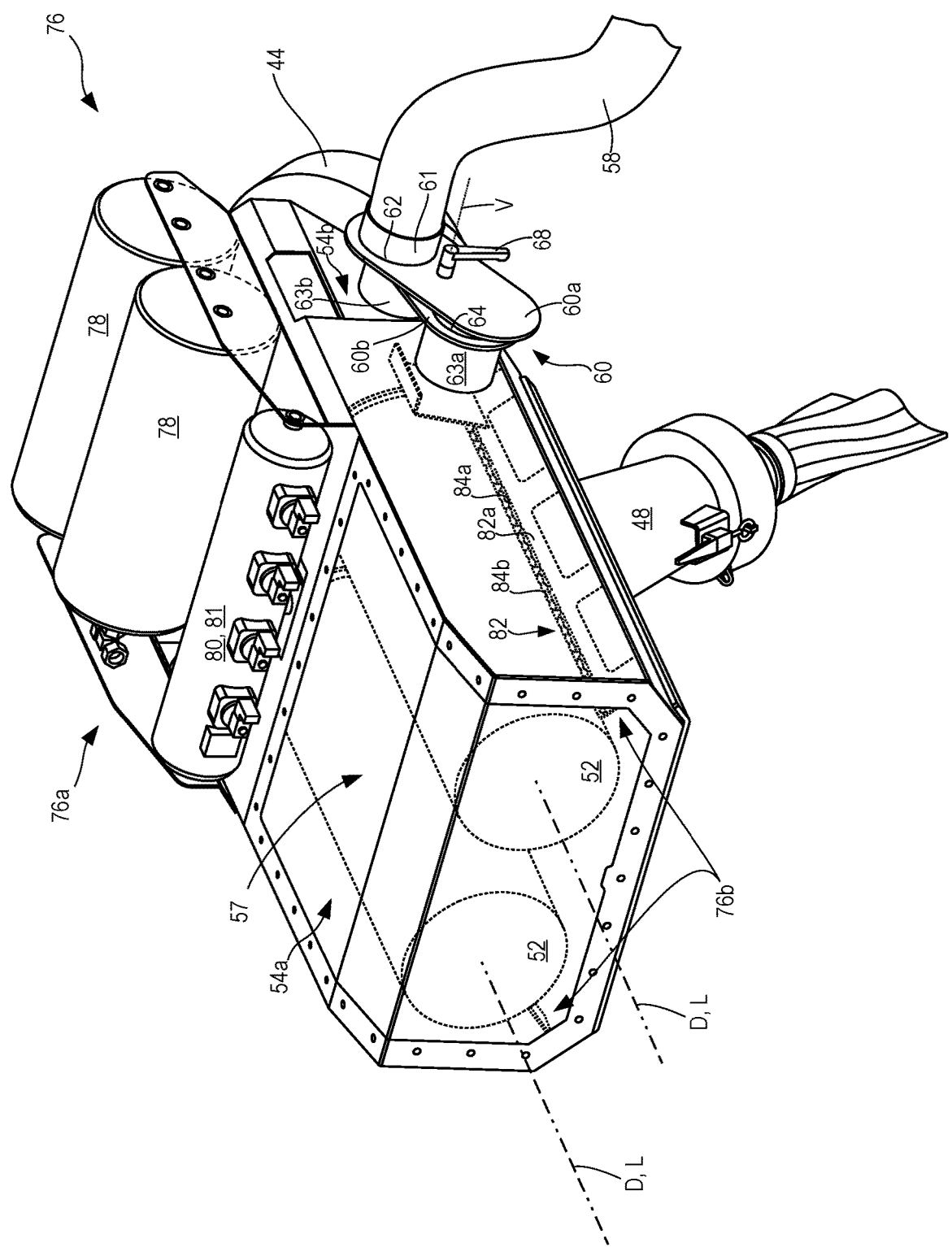
FIG. 4 is a schematic perspective view, obliquely from the front and above, of the filter apparatus of FIG. 3 without a prefilter.

In FIG. 4 two filter elements 52, by way of example, are depicted with dashed lines in interior space 57 of compartment 54a. The two filter elements 52 each extend along a longitudinal axis L that is also a rotation axis D of the respective filter element 52. Filter elements 52 are arranged with parallel longitudinal axes L. Filter elements 52 can each be rotated around rotation axis D by a rotational drive system 70 shown in FIG. 5.

Filter elements 52 are mounted at only one longitudinal end, in cantilevered fashion, on rotary bearings 72, from which they protrude along their longitudinal axis L or rotation axis D. Rotary bearings 72, which represent embodiments of filter element receptacles recited above, are arranged on filter housing 54 and comprise a coupling configuration to which a counterpart coupling configuration on a filter element 52 is detachably couplable. The result is that filter elements 52 on the one hand can be replaced quickly, and on the other hand can be arranged in filter housing 54 rotatably, with no relative motion means of their own, around rotation axis D. Rotational drive system 70 preferably interacts directly with rotary bearings 72 so that filter element 52 does not itself need to comprise any configuration for direct force transfer with rotary drive system 70. Rotary drive system 70 and rotary bearings 72 can comprise mutually meshing gears or tooth structures, the gear of rotary drive system 70 being driven by a motor. That motor can be a hydraulic motor or, preferably, an electric motor.

Thanks to the rotatability of filter elements 52, a different circumferential portion of filter element 52 can always be arranged so that it faces in direction of gravity g, so that gravity consequently assists the detachment and dropping of filter cakes that collect on the dirt side of filter material of filter elements 52 during filtering operation. A circumferential portion of filter element 52 faces in direction of gravity g when a surface normal vector proceeding from the surface of the filter material or from the envelope of the filter material has at least a component proceeding in the direction of gravity.

Figure 6:
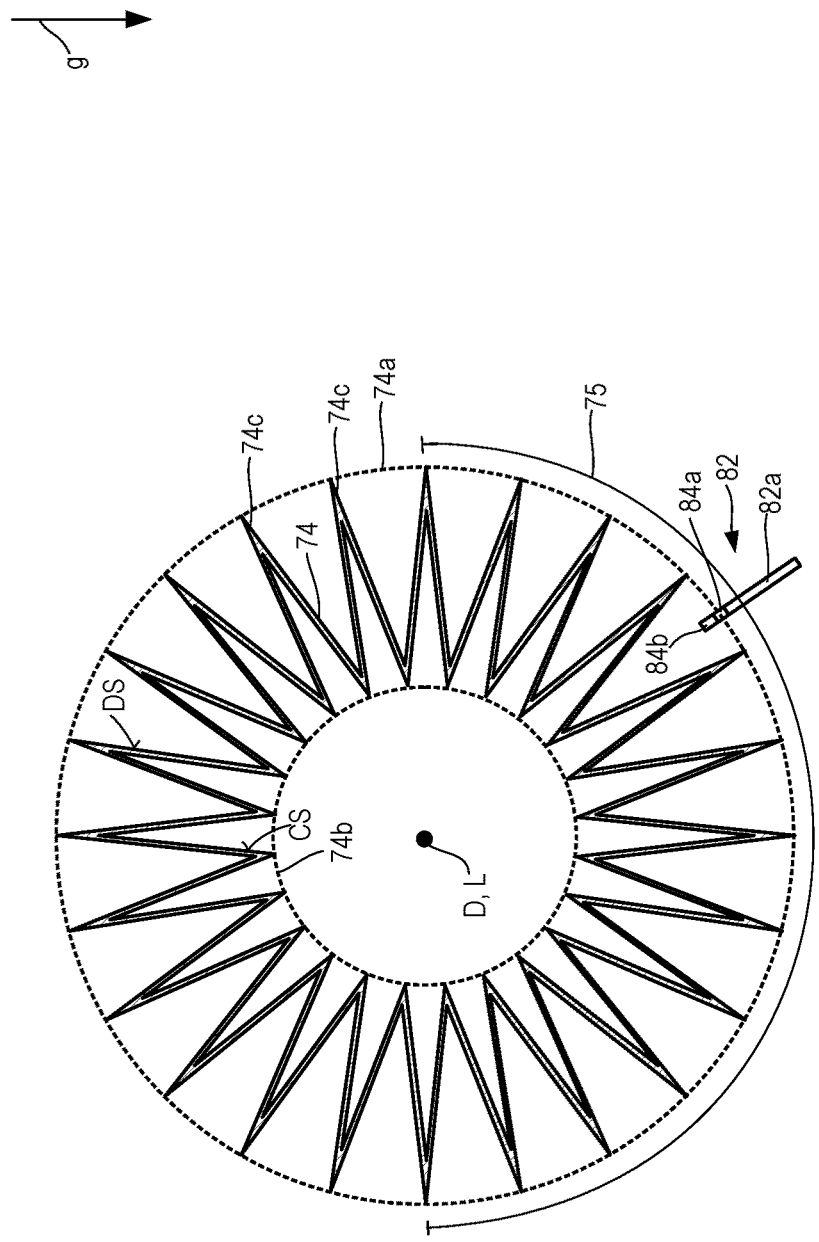
FIG. 6 is a schematic exemplifying cross-sectional view through the filter material of a filter element of the filter apparatus of FIGS. 1 to 5.

FIG. 6 is a simplified cross-sectional view through filter element 52 in a section plane orthogonal to rotation axis D. In the example depicted, filter material 74 is a pleated filter material 74 that proceeds around rotation axis D in zigzag fashion between a (by way of example) cylindrical radially outer envelope 74a and a (by way of example) cylindrical radially inner envelope 74b. Merely for explanation: for direction of gravity g shown by way of example in FIG. 6, circumferential portion 75 of filter material 74 faces in direction of gravity g. That side of filter material 74 which faces away from rotation axis D is dirt side DS, on which filter cake forms during filtering operation. The opposite side of filter material 74, facing toward rotation axis D, is clean side CS, onto which air that has been cleaned after passing through filter material 74 flows. Filter material 74 can be any porous material, for example a nonwoven filter or a filter paper.

Filter apparatus 42 comprises a cleaning apparatus 76 for removing filter cake from filter material 74 of filter elements 52. In the example depicted, cleaning apparatus 76 encompasses a pneumatic cleaning sub-apparatus 76a and a mechanical cleaning sub-apparatus 76b.

In the example depicted, pneumatic cleaning sub-apparatus 76a encompasses two compressed-air tanks 78 and a valve arrangement 80 which is pneumatically connected to compressed-air tanks 78 and is embodied to release compressed air from compressed-air tanks 78 in pulsed fashion toward clean side CS of filter material 74 of filter elements 52, so that pressure pulses which increase the air pressure on clean side CS as compared with dirt side DS are exerted on filter material 74. As a result of these pressure pulses, filter cake located on dirt side DS can be detached or in fact ejected from dirt side DS. A deformation of filter material 74, which assists the detachment of filter cake on dirt side DS, can also be brought about by the pressure pulses. A control apparatus 81, which controls the operation of pneumatic cleaning sub-apparatus 76a and of rotary drive system 70, can be received in the housing of valve arrangement 80.

The pressure pulses brought about by pneumatic cleaning sub-apparatus 76a are coordinated, in terms of their duration and/or the interval between two successive pressure pulses, with the rotary motion of filter elements 52 so as to ensure that when a pressure pulse is applied, it is not always the same circumferential portion of filter material 74 which is facing in direction of gravity g. It is thereby possible to ensure that the entire circumference of filter element 52 is affected by the cleaning action during a cleaning procedure.

Alternatively or, as in the exemplifying embodiment depicted, in addition to pneumatic cleaning, a mechanical cleaning sub-apparatus 76b is provided which assists the cleaning of filter material 74 by mechanical stress thereon.

Mechanical cleaning sub-apparatus 76b encompasses a wiper bar 82 that extends along longitudinal axis L or rotation axis D of filter element 52. The wiper bar preferably extends through the radially outer (cylindrical, in the example depicted) envelope 74*a* toward rotation axis D of filter element 52, as depicted in FIG. 6. Upon rotation of filter element 52 around rotation axis D, the radially outer folds 74*c* of the pleated filter material then wipe against wiper bar 82, with the result that on the one hand the spacing between two radially outer folds 74*c* that are directly successive to one another in a circumferential direction becomes temporarily increased, so that filter cake received between those folds can more easily fall out; and on the other hand, after the abutting engagement of wiper bar 82 with a radially outer fold 74*c* ends, a force that acts on radially outer fold 74*c* and deforms it in a circumferential direction abruptly ends, so that radially outer fold 74*c* that was initially deformed in a circumferential direction returns to its original conformation because of its material elasticity, which can have a further filter-cake-loosening effect. Lastly, wiper bar 82 wipes mechanically along at least a portion of filter material 74 and thereby mechanically scrapes filter cake off filter material 74.

In order to reduce stress on the porous, and therefore possibly sensitive, filter material 74, wiper bar 82 has on its side facing toward rotation axis D a plurality of projections 84 that each protrude from a carrier region 82*a* of wiper bar 82 toward rotation axis D and thus toward filter element 52. Each projection 84 comprises a strut region 84*a* located closer to carrier region 82*a* and connected preferably integrally thereto, and a wiper region 84*b* adjoining strut region 84*a* toward rotation axis D and connected preferably integrally thereto. Strut region 84*a* of a projection 84 is embodied to be shorter in a longitudinal direction of wiper bar 82 than wiper region 84*b*, which projects on both sides beyond strut region 84*a* preferably in a longitudinal direction of wiper bar 82. Wiper region 84*b* of each projection 84 thus furnishes a wiping length that is as long as possible, and strut region 84*a* defines the deformation resistance of projection 84 and thus the maximum load applied by wiper bar 82 onto filter material 74. Wiper bar 82 can thus be manufactured advantageously from stainless steel sheet. All projections 84 are preferably embodied identically.

Figure 5:
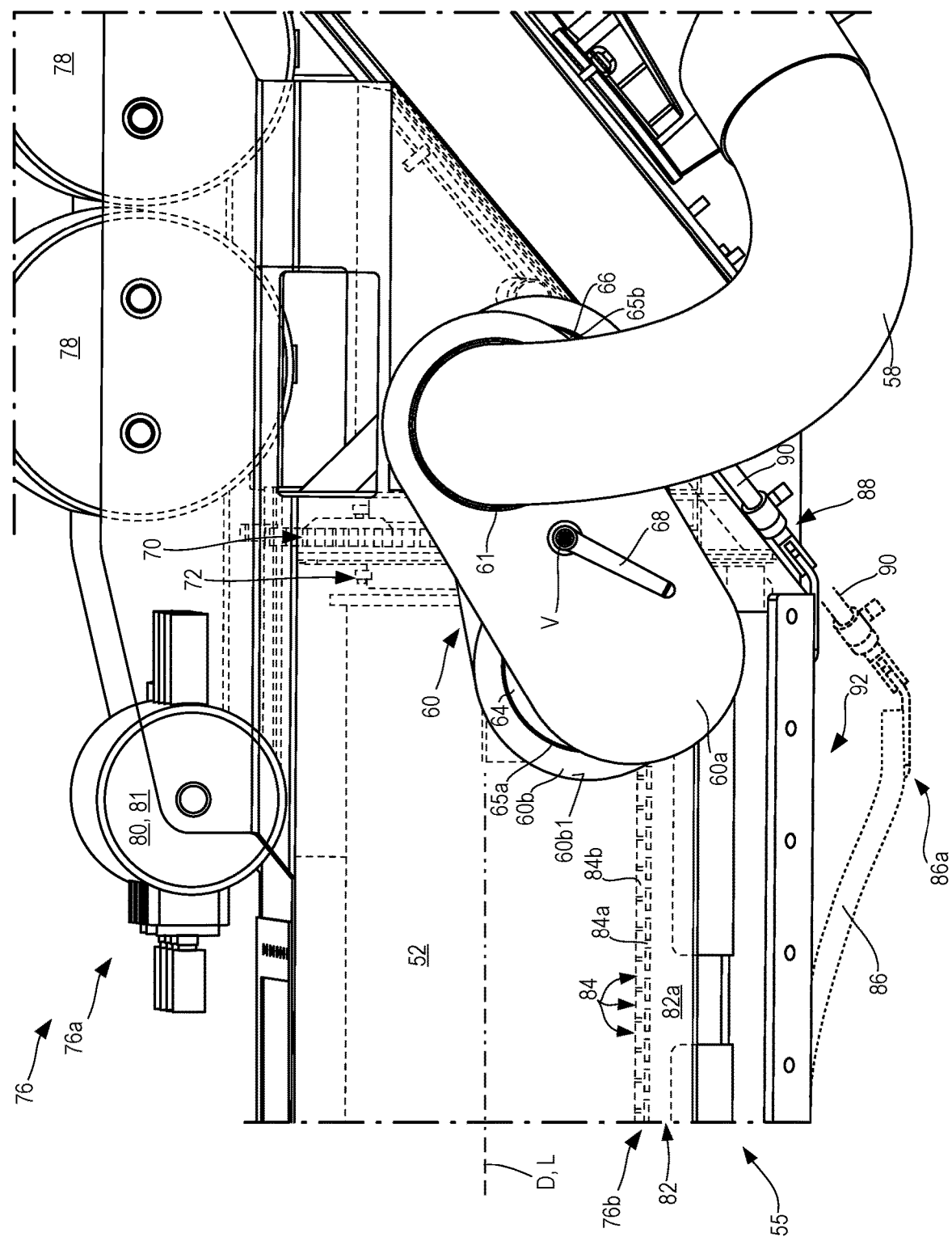
FIG. 5 is an enlarged schematic side view of the bypass valve of the filter apparatus of the earth working machine of FIG. 1.

When filter apparatus 42 is in the operationally ready installed state, filter housing 54 comprises a housing floor 86 which faces toward ejector belt 34 and which is shown in FIG. 5 with dashed lines in a position that is lifted away from the remainder of filter housing 55, i.e. from filter housing 54 not having a housing floor 86. In the usual, non-lifted position, housing floor 86 is concealed by the side wall of filter housing 54.

Housing floor 86 is manufactured from an elastomeric material, for example natural rubber, vulcanized rubber, silicone rubber, etc. Housing floor 86 can be reinforced with inserts, for example fabric or plies, in order to increase the tearing strength of housing floor 86. In the example depicted, the remainder of filter housing 55 is made of sheet metal. That need not be the case, however. Filter housing 54 can comprise more than just one wall made of an elastomeric material.

At its lower end 86*a*, in the installation situation tilted with respect to direction of gravity g as is evident from FIGS. 1 to 3, housing floor 86 is coupled to an actuator 88 fastened on filter housing 54 or on enclosure 38. Actuator 88 can be a pneumatic or hydraulic actuator and can encompass as an actuation member 90, for example, a piston rod extendable out of and retractable into a cylinder, or can be an electrical or electromagnetic actuator whose actuation member 90 is electrically or electromagnetically displaceable.

Actuation member 90 of actuator 88 is shown with dashed lines in its extended position. With actuation member 90 in this extended position, lower longitudinal end 86*a* of housing floor 86 is lifted away from the remainder of filter housing 55 so that there is formed between housing floor 86, more precisely its lower longitudinal end 86*a*, and the remainder of filter housing 55, an outlet opening 92 through which material that has accumulated in filter housing 54, in particular in compartment 54*a* receiving filter element 52, in the course of operation can be released out of interior space 57 of filter housing 54 toward transport apparatus 26, more precisely toward ejector belt 34. This is, as a rule, material that the extracted air has entrained and that has been filtered out of the air by filter elements 52 and/or has become deposited on the inner walls of filter housing 54. The material can encompass removed substrate material in the form of anything from dust to fragments of densified material.

The removed substrate material usually has a high moisture content, since water is usually sprayed into milling drum housing 22 in order to suppress excessive dust generation and to cool the milling bits. The removed mineral substrate material tends to densify in a moist environment, a property that is in fact exploited in order to immobilize dust by spraying in water. Rock-hard mineral deposits can thereby form on the inner surfaces of the filter housing.

The deformable embodiment of housing floor 86 thanks to the use of elastomeric material has a further advantageous effect: as a result of the deliberate deformability of housing floor 86, substrate material caked onto it can be detached from housing floor 86. The same applies to any other wall of filter housing 54, which can likewise have adhering substrate material removed from it by deformability orthogonally to its wall surface. It is therefore advantageous if further walls of filter housing 54 are constituted from elastomeric material or from thin sheet steel having a comparatively low resistance to bending or flexing.

Deformation of an elastomeric wall of filter housing 54 can be accomplished in simple fashion by means of cleaning apparatus 76, more precisely by means of pneumatic cleaning sub-apparatus 76*a*. When the latter increases the pressure in interior space 57 of filter housing 54, the deformable walls of filter housing 54 bulge outward, with the result that adhering consolidated mineral layers of removed substrate material flake off and can lie loose, as fragments, in interior space 57 of filter housing 54. The flaked-off fragments can then be discharged through outlet opening 92 onto transport apparatus 26 and transported by it for ejection at delivery location 28. Valve arrangement 80 can increase the pressure in interior space 57 of filter housing 54, in particular in compartment 54*a*, in simple fashion via pneumatic lines connected thereto.

Valve arrangement 80 can be actuatable from operator's platform 24. Control apparatus 81 can furthermore initiate a cleaning operation of filter housing 54 at predetermined time intervals by corresponding application of control to valve arrangement 80.

Just as pneumatic cleaning sub-apparatus 76*a* can generate an overpressure in filter housing 54, conveying fan 44 can generate a negative pressure in filter housing 54, since filter housing 54 is located on the intake side of conveying fan 44. By appropriate coordination between the operation of pneumatic cleaning sub-apparatus 76*a* and that of conveying fan 44, for example by alternating operation of those devices, filter housing 54, and thus its walls, can be exposed to an alternating overpressure/negative-pressure stress that further facilitates a flexing motion of walls of filter housing 54 in order to detach hardened substrate material caked onto them.

Compressed-air tanks 78 can be connected, if applicable likewise via valve arrangement 80, to an onboard compressor that ensures a constant or quasi-constant compressed-air level in compressed-air tanks 78.

The invention claimed is:

1. A self-propelled earth working machine, comprising:
a plurality of ground engaging units;
a machine frame height adjustably supported from the ground engaging units;
a working apparatus supported from the machine frame and configured to remove material from a region of a substrate; and
an extraction device configured to extract dust-laden air generated by the working apparatus from at least one extraction location, and to exhaust extracted air at a discharge location different from the extraction location, the extraction device including a filter apparatus arranged along an operational flow path from the at least one extraction location to the discharge location, the filter apparatus including:
a filter housing;
a filter element received in the filter housing, the filter element being configured to remove dust particles from the air flowing through the filter apparatus;
a bypass valve shiftable between a filtering operating position and a bypass operating position;
wherein in the filtering operating position the bypass valve connects the at least one extraction location to the discharge location through the bypass valve and the filter element; and
wherein in the bypass operating position the bypass valve connects the at least one extraction location to the discharge location through the bypass valve while bypassing the filter element.

2. The self-propelled earth working machine of claim 1, wherein:
the filter housing includes an interior space, the filter element being received in the interior space;
in the filtering operating position of the bypass valve the interior space of the filter housing is a part of the operational flow path connecting the at least one extraction location to the discharge location; and
in the bypass operating position of the bypass valve the at least one extraction location is connected to the discharge location while bypassing the interior space.

3. The self-propelled earth working machine of claim 1, wherein:
the bypass valve includes a filter-housing-mounted valve component mounted on the filter housing and a movable valve component movable relative to the filter housing.

4. The self-propelled earth working machine of claim 3, wherein:
the movable valve component is translationally displaceable relative to the filter-housing-mounted valve component.

5. The self-propelled earth working machine of claim 3, wherein:
the movable valve component is pivotable around a valve axis through a predetermined angle relative to the filter-housing-mounted valve component.

6. The self-propelled earth working machine of claim 3, wherein:
the extraction device further includes a conveying conduit upstream of the bypass valve, the conveying conduit including an exit opening connected to the movable valve component.

7. The self-propelled earth working machine of claim 3, wherein:
the filter-housing-mounted valve component and the movable valve component include mutually facing sides, and at least one of the mutually facing sides includes a flat bounding surface surrounding an opening of the respective valve component.

8. The self-propelled earth working machine of claim 3, wherein:
the movable valve component includes a plate-shaped, flat component and at least one attachment configuration protruding from an upstream side of the movable valve component for attaching an air-carrying conveying conduit.

9. The self-propelled earth working machine of claim 3, wherein:
the filter-housing-mounted valve component includes a plate-shaped, flat component and at least one attachment configuration protruding from a downstream side of the filter-housing-mounted valve component.

10. A self-propelled earth working machine, comprising:
a plurality of ground engaging units;
a machine frame height adjustably supported from the ground engaging units;
a working apparatus supported from the machine frame and configured to remove material from a region of a substrate; and
an extraction device configured to extract dust-laden air generated by the working apparatus from at least one extraction location, and to exhaust extracted air at a discharge location different from the extraction location, the extraction device including a filter apparatus arranged along an operational flow path from the at least one extraction location to the discharge location, the filter apparatus including:
a filter housing;
a filter element received in the filter housing, the filter element being configured to remove dust particles from the air flowing through the filter apparatus;
a bypass valve shiftable between a filtering operating position and a bypass operating position, the bypass valve including a filter-housing-mounted valve component mounted on the filter housing and a movable valve component movable relative to the filter housing;
wherein in the filtering operating position the bypass valve connects the at least one extraction location to the discharge location through the filter element;
wherein in the bypass operating position the bypass valve connects the at least one extraction location to the discharge location while bypassing the filter element;
wherein the filter housing includes a first compartment, the filter element being received in the first compartment; and
wherein the filter-housing-mounted valve component includes first and second entry openings, the first entry opening being communicated with the first compartment.

11. The self-propelled earth working machine of claim 10, wherein:
the filter housing includes a second compartment which does not perform any filtering operation; and
the second entry opening is communicated with the second compartment.

12. The self-propelled earth working machine of claim 10, wherein:
the movable valve component includes an exit opening configured to be communicated with one of the first and second entry openings; and
the movable valve component is configured to close off the other one of the first and second entry openings which is not communicated with the exit opening of the movable valve component.

13. The self-propelled earth working machine of claim 10, wherein:
the movable valve component includes an exit opening configured to be communicated with one of the first and second entry openings; and
the bypass valve further includes at least one sealing configuration projecting from the entry openings of the filter-housing-mounted valve component or the exit opening of the movable valve component toward the other of the valve components to span a separating gap between the movable valve component and the filter-housing-mounted valve component.

14. A self-propelled earth working machine, comprising:
a plurality of ground engaging units;
a machine frame height adjustably supported from the ground engaging units;
a working apparatus supported from the machine frame and configured to remove material from a region of a substrate; and
an extraction device configured to extract dust-laden air generated by the working apparatus from at least one extraction location, and to exhaust extracted air at a discharge location different from the extraction location, the extraction device including a filter apparatus arranged along an operational flow path from the at least one extraction location to the discharge location, the filter apparatus including:
a filter housing;
a filter element received in the filter housing, the filter element being configured to remove dust particles from the air flowing through the filter apparatus;
a bypass valve shiftable between a filtering operating position and a bypass operating position, the bypass valve including a filter-housing-mounted valve component mounted on the filter housing and a movable valve component movable relative to the filter housing;
wherein in the filtering operating position the bypass valve connects the at least one extraction location to the discharge location through the filter element;
wherein in the bypass operating position the bypass valve connects the at least one extraction location to the discharge location while bypassing the filter element; and
wherein the bypass valve further includes a valve drive system configured to shift the bypass valve between the filtering operating position and the bypass operating position upon actuation of a control switch on an operator's platform of the earth working machine.

* * * * *